Feb. 19, 1963 H. H. NICK 3,078,417
COUNTER EMPLOYING LOGIC GATES IN FEEDBACK TO ACHIEVE PROPER COUNTING MODE
Filed Dec. 29, 1960 2 Sheets-Sheet 1

INVENTOR
HOWARD H. NICK
BY
Walter F. [signature]
AGENT

Feb. 19, 1963 H. H. NICK 3,078,417

COUNTER EMPLOYING LOGIC GATES IN FEEDBACK TO ACHIEVE PROPER COUNTING MODE

Filed Dec. 29, 1960 2 Sheets-Sheet 2

United States Patent Office 3,078,417

Patented Feb. 19, 1963

3,078,417

COUNTER EMPLOYING LOGIC GATES IN FEEDBACK TO ACHIEVE PROPER COUNTING MODE

Howard H. Nick, Wappingers Falls, N.Y., assignor to International Business Machines Corporation, New York, N.Y., a corporation of New York Filed Dec. 29, 1960, Ser. No. 79,407
7 Claims. (Cl. 328—45)

This invention relates to electronic counters of the type commonly used in computers and more particularly to an inherently binary counter utilizing a series of trigger circuits interconnected in a novel manner to count in a radix other than a power of two.

The maximum number of permutations of an N stage binary counter is $2^N$. If a counter is composed of N binary counter stages interconnected to count with a maximum number of permutations $2^N$, an output is generated for every $2^N$ input and it is said to count in a radix of $2^N$.

For certain applications, it becomes desirable to count in a radix which is not a power of two. The most elementary radix in this class is three, which would require at least two binary stages. Ten is another radix which is not a power of two and is very commonly used. The novel features of the present invention are described in relation to the type of counter commonly referred to as a binary coded decimal counter which, as is evident from its name, has a radix of ten. It will be obvious to those skilled in the art that the invention is applicable to counters other than decimal having radices which are not powers of two.

Previous binary code decial counters have been of several types utilizing such various codes as the excess three code, the two out of five code, or a one, two, four, eight weighted binary code. The counter herein described is of the one, two, four, eight weighted binary type. In counters using this particular code it is necessary to utilize the output of the fourth binary stage to inhibit the counter from continuing in a normal binary count after reaching the number 1001. This is usually done by clearing the fourth stage to "zero" when the output of the first binary stage goes from "one" to "zero" and additionally inhibiting the second stage binary trigger from setting to "one" whenever the output of the fourth stage is in the "one" state.

In the prior art, the means provided for converting inherently binary counters to decade counters generally require that the binary triggers which are employed either have two outputs which are complements of each other or one output and an inverting circuit to feed back the output of the fourth binary trigger to the second. This requires additional circuitry to provide the inverted output.

Other counters of the type found in the prior art use a capacitor circuit for feeding back pulses from higher to lower order trigger circuits in a series of such circuits so that the counter has an output for each ten entries received by it. The use of capacitor feedback to effect the conversion from a binary to a decade counter makes the circuit frequency discriminative and a wide range of input frequencies cannot be tolerated.

Accordingly, an object of this invention is to provide an improved binary coded counter which will count in a radix which is not a power of two.

An additional object is to provide an improved binary coded decimal counter.

Another object of this invention is to provide a decade counter which is an inherently binary counter comprised of triggers with only one output.

A further object of this invention is to provide a binary coded decimal counter without utilizing inverter circuits.

Another object is to provide an improved decade counter from an inherently binary counter which utilizes two element gas tubes as storage devices in the trigger circuits.

Another object is to provide an improved decade counter from an inherently binary counter without the use of capacitive feedback coupling.

Still another object of this invention is to provide a low cost binary decimal counter.

Another object of this invention is to provide a binary decade counter which does not necessitate the use of vacuum tube type triggers.

The normal operation of a binary counter stage is that when both inputs receive pulses simultaneously the counter stage will change from one state to the other regardless of which state it was previously occupying. The novel counting circuit of this invention has one binary counter stage which has the feature that when both inputs are pulsed simultaneously, no change of state occurs in the trigger.

By utilizing this feature in a novel binary coded decimal counter it is possible to utilize the output of the fourth binary stage to inhibit the setting of the second binary sage without the use of inverters or capacitive feedback coupling. By changing the number of counter stages intermediate these stages and by eliminating the first counting stage, counters of other radices may be constructed utilizing the novel feature of the invention.

The foregoing and other objects, features and advantages of the invention will be apparent from the following more particular description of a preferred embodiment of the invention, as illustrated in the accompanying drawings.

Figure 1:
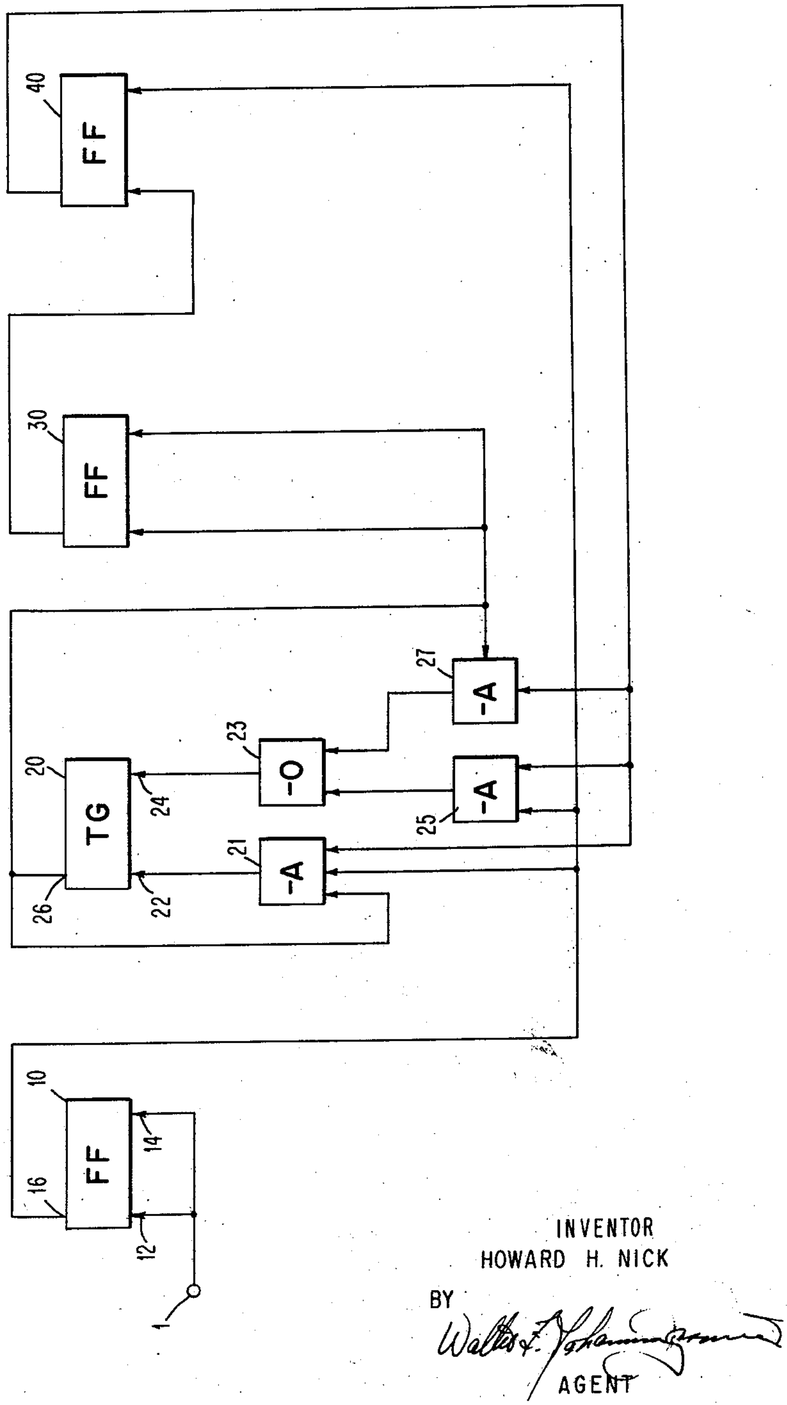
FIG. 1 is a block diagram of a preferred embodiment of the novel counter.

Referring now to FIG. 1, four binary counter stages 10, 20, 30 and 40 are shown in which the binary counter stages 10, 30 and 40 may be bistable devices known as flip-flop circuits of a type well-known in the art. Each flip-flop has two stable states and two inputs responsive to negative voltage transitions. An input pulse received simultaneously at both inputs will cause the flip-flop to change from whatever stable state it is in to the opposite stable state and due to this complementing action the flip-flops operate to give one output pulse for every two input pulses. Trigger 20 which will be described in more detail later, is a special type of bistable device which responds to negative voltage transitions and has the feature that when input pulses are received simultaneously at inputs 22 and 24, no change of state will occur in the trigger.

Throughout the circuitry, two voltage levels are significant. The positive voltage level at the output of the flip-flops or the trigger represents the "one" state and a negative voltage indicates the "zero" state.

The negative AND circuits 21, 25 and 27 and negative OR circuit 23 may be of several types of circuits for generating an output signal upon coincidence of input signals which are well-known in the art. Accordingly, the negative AND circuit 21 will serve to set the trigger 20 to the "one" state only when the following conditions become available: trigger 20, flip-flop 10, and flip-flop 40 must all be in the "zero" state. With these conditions present the output voltage of the negative AND circuit 21 will become negative, causing the trigger 20 to assume the "one" state.

Negative OR circuit 23 serves as an inhibit circuit in its application to this counter. If either of its inputs is negative the output will be negative and a negative voltage transition will actuate input 24 of trigger 20 to cause trigger 20 to assume the "zero" state. The output of negative AND circuit 27 serves as the inhibiting input to the negative OR circuit 23 in the following manner: If the output of the negative AND circuit 27 is in the negative condition at the time a negative pulse is received from negative AND circuit 25, the output of negative OR circuit 23 will already be negative and the input from negative AND circuit 25 will have no effect on trigger 20. Thus, if both of the inputs to negative AND circuit 27 are negative, which occurs when trigger 20 and flip-flop 40 are both in the "zero" state, an input pulse from flip-flop 10 will have no effect at the input 24 to trigger 20. If, however, either the trigger 20 or trigger 40 is in the "one" state the output voltage from negative AND circuit 27 cannot operate to inhibit an input pulse from negative AND circuit 25, and a negative pulse will appear at input 24 of trigger 20 thus causing it to assume the "zero" condition. A rising voltage at the input to any of the flip-flops or the trigger 20 will not change the state of the trigger.

The pulses to be counted are applied to the input terminal 1 and the state of each stage of the counter, after each pulse is counted, is shown in Table I.

| Input pulses | FF 40 | FF 30 | TG 20 | FF 10 |
|---|---|---|---|---|
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| 10 | 0 | 0 | 0 | 0 |
| 11 | 0 | 0 | 0 | 1 |

It should be noted that the counter counts in ordinary binary counter fashion through the count of 1001. The circuits are all reset to "zero" by the tenth input pulse due to the unique circuitry associated with trigger 20. Prior to the tenth input pulse the flip-flops 10 and 40 are alone in the "one" state. In the normal binary counter fashion the next input pulse would cause flip-flop 10 to go to the "zero" state and trigger 20 would be complemented to the "one" state. However, this cannot happen at the present time because flip-flop 40, being in the "one" state, has held negative AND circuits 21, 25, and 27 to a positive output and therefore no change occurs in trigger 20. The change of state of flip-flop 10 actuates flip-flop 40 causing it to be cleared to the "zero" state. This change of state of flip-flop 40 is transmitted back through the negative AND circuits 21, 25, and 27, and their outputs simultaneously fall to the negative condition. Negative OR circuit 23 follows the change of outputs of negative AND circuits 25 and 27 and therefore inputs 22 and 24 of trigger 20 are simultaneously pulsed negatively and, as previously stated, no change of state occurs in the trigger. Thus, on final analysis we find that the tenth input pulse has cleared the counter to all "zeros," the initial condition before the first input pulse was received. Upon receipt of the eleventh input pulse the action will be the same as with the first input pulse. It will now be evident that the counter counts up to nine and is cleared to zero by every tenth input pulse.

Figure 2:
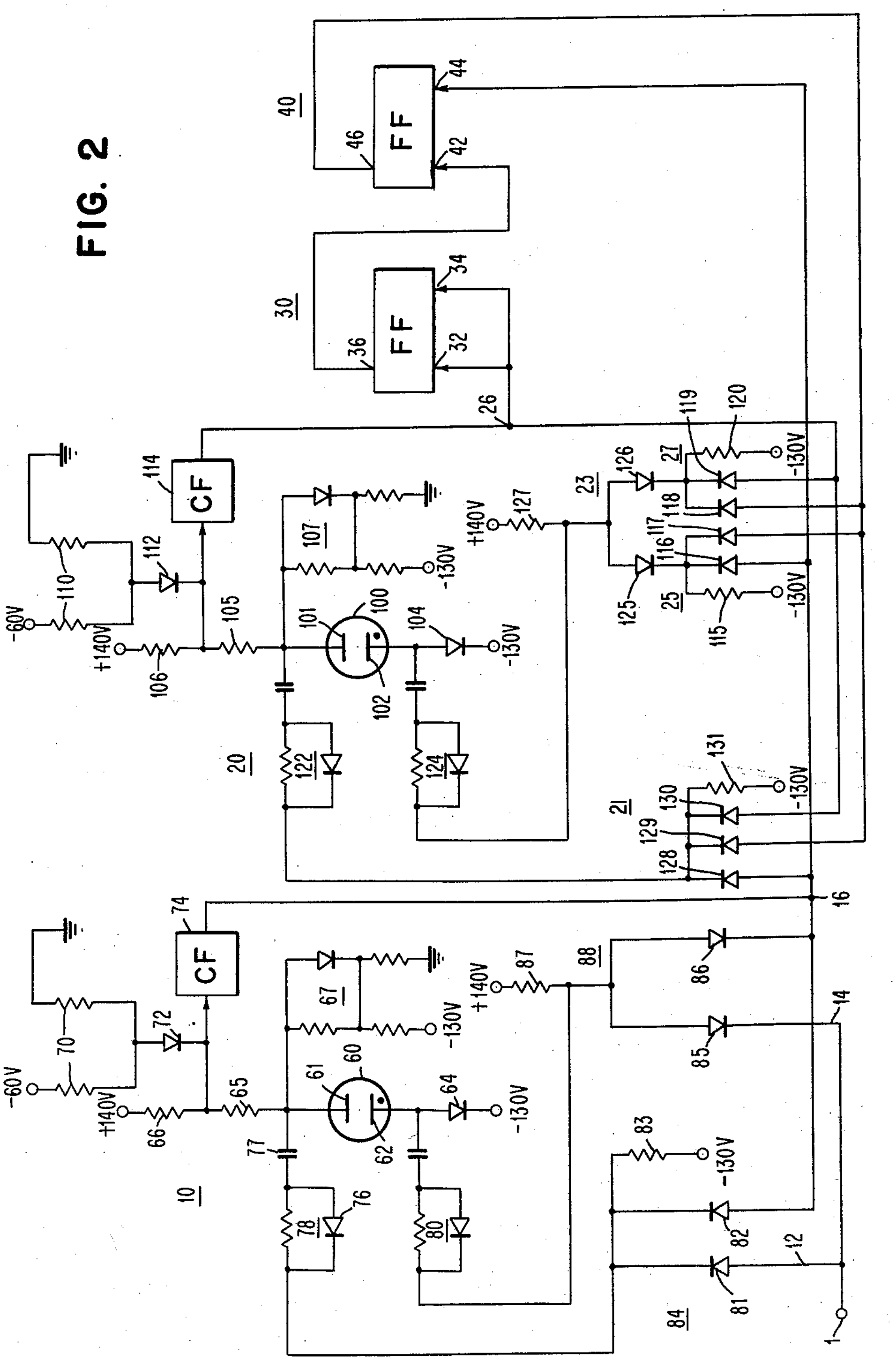
FIG. 2 is a circuit diagram of a preferred embodiment of the novel counter.

More specifically, FIG. 2 is a circuit diagram of the counter with a preferred embodiment of one of the flip-flop circuits and a preferred embodiment of the trigger 20.

The preferred embodiment of flip-flop 10 consists of a gas tube 60 having an anode 61 and a cathode 62, anode 61 being biased by resistors 66, 65 and biasing network 67. The cathode is biased through a diode 64 to a minus 130 volt supply to maintain the bias voltage across gas tube 60 between its extinguishing voltage and its ignition voltage so that in the stable biased condition the tube will either be held conductive or nonconductive depending on what state it has previously reached.

The output voltage of the flip-flop is regulated by a biasing network 70 and diode 72 to keep the output voltage from falling below a predetermined negative voltage level. The output is amplified in a cathode follower 74 and appears at the output 16. Resistor 87 and diodes 85 and 86 comprise a negative OR circuit 88 whose output is coupled through input coupling circuit 80 to the cathode 62 of the gas tube 60. Resistor 83 and diodes 81 and 82 comprise a negative AND circuit 84 whose output is coupled through input coupling circuit 78 comprised of a resistor 75, a diode 76 and a capacitor 77 to anode 61 of gas tube 60.

Trigger 20 is comprised of a gas tube 100 having an anode 101 and a cathode 102. The anode 101 is biased through resistors 106 and 105 and the biasing network 107. Cathode 102 is biased by the minus 130 volt supply through a diode 104 to establish a bias across gas tube 100 similar to that across gas tube 60. Input signals to the anode are coupled through input coupling circuit 122 and those to the cathode through input coupling circuit 124. As in flip-flop 10, a network is provided which consists of a resistive circuit 110 biasing diode 112 to limit the negative swing of the output voltage. This output is amplified in a cathode follower 114 and appears at the output 26. Negative OR circuit 23 is comprised of a resistor 127 and diodes 125 and 126. Diodes 128 and 129, 130 and resistor 131 form the negative AND circuit 21; resistor 115, diodes 116 and 117 comprise negative AND circuit 25; and diodes 118 and 119 and resistor 120 comprise a negative AND circuit 27.

Flip-flop 30 has an input 32 for setting it to the "one" state and an input 34 for setting it to the "zero" state. Its output 36 is coupled to the input 42 of flip-flop 40 for setting it to the "one" state. Flip-flop 40 also has an input 44 for setting it to the "zero" state and an output terminal 46.

The input coupling circuits 78, 80, 122 and 124 all operate in a like manner to cause the circuits to react only to a negative shift in voltage.

The operation of the counter will be described starting from a setting of all "zeros" in the flip-flops and in the trigger. Under this condition both gas tube 60 and gas tube 100 will be in the conducting state and all outputs will be at the negative voltage level.

Prior to receipt of the first input pulse, gas tube 60 is conducting and the output terminal 16 is negative. This negative voltage applied to diode 86 causes diode 85 to become back biased. Diode 82, on the other hand, is back biased by the negative output voltage because diode 81 is forward biased by the positive voltage at input terminal 1. Receipt of a negative input pulse at input terminal 1 is transmitted through input terminals 12 and 14 to diodes 81 and 85 respectively. However, since diode 85 is back biased no change of voltage occurs at the input coupling circuit 80 to the cathode 62 of gas tube 60, whereas the drop in voltage at the input to diode 81 of negative AND circuit 84 causes the output of that negative AND circuit to fall to the negative level.

The drop in voltage on the output of circuit 84 is coupled through input coupling circuit 78 to the anode 61 of gas tube 60 lowering the voltage below the extinguishing voltage of the tube and causing conduction to stop. The output voltage thereupon rises to the positive level signifying the "one" state in flip-flop 10. This rise of voltage at the output 16 will have no effect on succeeding stages of the counter since the circuits only react to negatively sloped voltage transitions.

When a second negative input pulse is applied to input terminal 1 and transmitted through inputs 12 and 14 to diodes 81 and 85 respectively of the flip-flop 10, the gas tube will be caused to ignite through the following sequence. The positive voltage at output 16 will cause diode 86 in negative OR circuit 88 to be reverse biased at the time that a negative voltage is applied to diode 85. Thus, the negative swing of voltage will be coupled through input coupling circuit 80 to cathode 62 of gas tube 60 causing diode 64 to become reverse biased and the voltage drop across the gas tube to exceed the firing potential whereby the gas tube will be ignited. The positive voltage at output 16, meanwhile, caused diode 81 to become reverse biased at the time that the input voltage started to drop because the output voltage of negative AND circuit 84 is held positive through the diode 82 by the output voltage at 16. When gas tube 60 begins to conduct, the output voltage drops to the negative level. As the voltage of the output 16 falls to the negative level, the input to input coupling circuit 78 also falls but since the voltage at the anode 61 is in transition from the positive to the negative level, the input voltage transition is not effective to stop conduction in the gas tube 60.

Since diodes 129 and 130 are reverse biased at this time, the drop of voltage at output 16 of flip-flop 10 is coupled through diode 128 of negative AND circuit 21 and through the input coupling circuit 122 of trigger 20 to anode 101 of gas tube 100 to stop conduction causing the output voltage at output 26 of trigger 20 to rise to the positive voltage level. Diodes 129, 117 and 118 have impressed upon them, meanwhile, the negative voltage level from the output 46 of flip-flop 40. Diode 119 will have a negative voltage applied to it prior to the arrival of the second pulse due to the fact that trigger 20 is in the "zero" state. The output of negative AND circuit 27 is at the negative level and this voltage acts through diode 126 of negative OR circuit 23 to inhibit any negative pulse which might be transmitted from the output of negative AND circuit 25 to diode 125 of negative OR circuit 23. Therefore, no shift of voltage will be felt at the cathode of gas tube 100, and the pulse at the anode 101 is effective to stop conduction. As gas tube 100 ceases to conduct, the voltage at output 26 rises to the positive level and the counter will now be set at 0010, flip-flop 10 being the lowest order of the counter.

The third input pulse serves to complement the first flip-flop in the same manner as the first input pulse. As with the first input pulse no reaction will be evident at the second trigger due to the fact that only a negative shift of voltage will cause a reaction in the trigger.

The fourth input pulse will complement flip-flop 10 in the same manner as the second input pulse. This time, however, the voltage at output 26 of trigger 20 is positive and will cause diode 128 of negative AND circuit 21 to be back biased due to the application of the positive voltage at output 26 to diode 130. The same positive voltage will forward bias diode 119 in negative AND circuit 27 so that diode 126 of negative OR circuit 23 will be reverse biased and a negative shift of voltage at the input to diode 125 will cause a negative shift of voltage at the output of negative OR circuit 23. The negative shift of voltage at the output 16 of flip-flop 10 is coupled through the diode 116 of AND circuit 25 creating a negative shift of voltage through diode 125 and input coupling circuit 124 to the cathode 102 of gas tube 100 to start conduction in the tube. As conduction starts, the voltage at output 26 will fall to the negative level. This fall in voltage will be coupled to both inputs 32 and 34 of flip-flop 30 causing it to be complemented to the "one" state with a positive voltage at output 36. The counter now is set to 0100.

The fifth input pulse will complement flip-flop 10 to the "one" state as did the first input pulse. Likewise, the sixth input pulse will complement flip-flop 10 back to the "zero" state and the consequent fall of voltage at output 16 of flip-flop 10 will complement trigger 20 to the "one" state. A seventh input pulse will merely complement flip-flop 10 to the "one" state.

Upon receipt of the eighth input pulse, flip-flop 10 will be complemented to the "zero" state, the fall of its output 16 will complement trigger 20 to the "zero" state, the fall of voltage at the output 26 of trigger 20 will complement flip-flop 30 to the "zero" state and the fall of voltage at output 36 of flip-flop 30 will act at input 42 of flip-flop 40 to cause it to be set to the "one" state. The rise of voltage at output 46 of flip-flop 40 will cause diodes 129, 117 and 118 to all become forward biased. The setting of the counter at this time is 1000.

Upon receipt of the ninth input pulse, flip-flop 10 is merely complemented to the "one" state.

Upon receipt of the tenth input pulse, flip-flop 10 is complemented to the "zero" state. The fall of voltage at its output 16 to the negative level will be effective at input 44 of flip-flop 40 to set it to the "zero" state. The output voltage at output 46 of flip-flop 40 will thus fall to the negative voltage and this will be coupled through diodes 129, 117 and 118 simultaneously to cause the output of negative AND circuits 21, 25 and 27, respectively, to drop to the negative voltage. Since the outputs of negative AND circuits 25 and 27 are coupled to diodes 125 and 126, respectively, of negative OR circuit 23, the output of negative OR circuit 23 will fall to the negative voltage level at the same time as the output of negative AND circuit 21. The transitions are transmitted through input coupling circuits 124 and 122, respectively, to both the anode 101 and the cathode 102 of gas tube 100. Since both the plate 101 and cathode 102 voltages shift the same amount, no essential voltage change is apparent across the tube and the gas tube will remain in the conductive "zero" state with a negative voltage at output 26.

At this point all of the stages are back in the "zero" state and a subsequent input pulse will have the same effect as the first one.

While the invention has been particularly shown and described with reference to a preferred embodiment thereof, it will be understood by those skilled in the art that various changes in form and details may be made therein without departing from the spirit and scope of the invention.

I claim:

1. An electrically operated multi-order counter of the type in which each order comprises a bistable device, the bistable devices being coupled in a tandem configuration so that each bistable device, except the one of lowest order, is switched by signals transmitted from the bistable device of next lower order each time the latter switches to one of its two stable states; the lowest order bistable device being switched by signals applied to a counter input terminal coupled thereto; characterized by the fact that one of said bistable devices includes a bistable element and two input circuit means coupled thereto having a common input terminal, said bistable element being responsive to a signal on one of said input circuit means to switch to one of its two stable states, to a signal on the other of said input circuit means to switch to the other of its stable states, and being adapted to remain unswitched when signals are transmitted concurrently by both of said input circuit means; output circuit means for said bistable element coupled to said input circuit means so as to normally render said input circuit means alternately effective to transmit switching signals to said bistable element from said common input terminal in dependence upon the state of said bistable element; and means coupling another of said bistable devices to said input circuit means so as to modify their normal control by said bistable element to transmit signals concurrently on said input circuit means in dependence upon the state of said other bistable device.

2. In a device for counting electrical signals, the combination comprising: an input terminal adapted to receive signals to be counted; first bistable means for storing a manifestation of a binary digit and generating a signal indicative of the state of said first bistable means; second bistable means in a higher order of said counter and having a "one" stable state and a "zero" stable state; means for switching said second bistable means to the "one" or to the "zero" stable state; said first bistable means having first input means for setting it to the "one" state and second input means for setting it to the "zero" state and the characteristic that when said first and second input means receive signals simultaneously no change of state will occur; control means connected to said input terminal and to said second bistable means for directing signals to be counted alternately to said first and second input means of said first bistable means when said second bistable means is in the "zero" state to change the state of said first bistable device, and for directing signals simultaneously to said first and second input means upon receiving a signal to be counted when said second bistable means is in the "one" state.

3. In a device for counting electrical signals, the combination comprising: first bistable means for storing a manifestation of a binary digit and generating a signal indicative of the state of said means; second bistable means in a higher order of said counter and having a "one" and a "zero" stable state; means intermediate said first and second bistable means and responsive to the output signal of said first bistable means to set said second bistable means to the "one" state upon receipt of a predetermined number of said output signals of said first bistable means; means for setting said second bistable means to the "zero" state; said first bistable means having first input means for setting it to the "one" state and second input means for setting it to the "zero" state and the characteristic that when said first and second input means receive signals simultaneously no change of state will occur; and control means responsive to the output signal of said second bistable device for directing signals to be counted alternately to said first and second input means of said first bistable means when said second bistable device is in the "zero" state to change the state of said first bistable device, and for inhibiting the application of input signals when said second bistable device is in the "one" state and for directing signals simultaneously to said first and second input means when said second bistable device is in transition from said "one" to said "zero" state whereby no change of state will occur in said first bistable device.

4. In a device for counting electrical signals, the combination comprising: a first bistable device having a "one" and a "zero" stable state and a first and a second input for receiving signals to set said bistable device to said "one" and to said "zero" state respectively and the characteristic that when signals are received simultaneously at both inputs no change of state will occur in the device; a second bistable device in a higher order of said counter and having a "one" and a "zero" stable state; means intermediate said first and second bistable devices and responsive to the output signal of said first bistable device to set said second bistable device to the "one" state upon receipt of a predetermined number of output signals from said first bistable device; means for applying signals to be counted to said second bistable device to set it to the "zero" state; and control means responsive to the output signal of said second bistable device for directing signals from said input signal means alternately to said first and second inputs of said first bistable device when said second bistable device is in the "zero" state to change the state of said first bistable device, and for inhibiting the application of input signals when said second bistable device is in the "one" state, and for directing signals simultaneously to said first and second inputs when said second bistable device is in transition from said "one" to said "zero" state whereby no change of state will occur in said first bistable device.

5. In a device for counting electrical signals; a first bistable device generating a first output signal, having a first input for receiving electrical signals to set said bistable device to a first stable state and a second input for receiving electrical signals to set said bistable device to a second stable state and wherein a simultaneous application of signals at both of said first and second inputs will cause no change of state; a higher order bistable device generating a second output signal; reset means for clearing said higher order bistable device to a second stable state; a first AND gate responsive to the signals to be counted, to said first output signal and to said second output signal to generate a third signal to set said first bistable device to said first stable state upon coincidence of these signals; a second AND gate responsive to the signals to be counted and to said second output signal to generate a fourth signal; a third AND gate responsive to said second output signal and to said first output signal which is a manifestation of the first stable state of said first bistable device to generate a fifth signal; a first OR gate responsive to either of said fourth or fifth signals to generate a sixth signal to set said first bistable device to said second stable state; and means intermediate said first bistable device and said higher order bistable device and responsive to the output signal of said first bistable device to generate an input signal to set said higher order bistable device to said first stable state upon receiving a predetermined number of said first output signals; whereby said higher order bistable device will condition all of said first, second, and third AND gates simultaneously upon being cleared to said second stable state by said reset means to direct simultaneous input pulses to said first and second inputs of said first bistable device.

6. In a binary decade counter; a first binary counting means responsive to input signals to give a first output signal for every two input signals and having a "one" and a "zero" state; a first bistable device having a first input means for setting to a first stable state and a second input means for setting to a second stable state and wherein the simultaneous arrival of signals at both of said first and second input means will be inoperative to cause a change of state of said first bistable device, said first bistable device having output means for generating a second output signal; second binary counting means responsive to said second output signal to generate a third output signal for every two of said second output signals; a second bistable device having third input means responsive to said third output signal for setting to a first stable state; fourth input means responsive to said first output signal for setting to a second stable state, and means for manifesting the state of said second bistable device as a fourth output signal; a first coincidence circuit responsive to said first output signal, to said second output signal, and to said fourth output signal to provide an input signal to set said first bistable device to said first stable state upon coincidence of signals indicative that the first binary counting means is in a "zero" state and each of said first and second bistable devices are in said second stable state; a second coincidence circuit responsive to said first output signal and to said fourth output signal to generate a fifth signal upon coincidence of signals indicative that said second bistable device is in said second stable state and said first binary counting means is in the "zero" state; third coincidence means responsive to said second output signal and to said fourth output signal to provide a sixth signal when said first and second bistable devices are in said second stable state; and fourth coincidence means responsive to said fifth and sixth output signals to impress a signal upon said second input to said first bistable device to set said first bistable device to said second stable state.

7. A counter of the type described in claim 6 wherein the first bistable device comprises a gaseous discharge tube.

References Cited in the file of this patent

UNITED STATES PATENTS

| | | |
|---|---|---|
| 2,824,961 | Paivinen | Feb. 25, 1958 |
| 2,971,157 | Harper | Feb. 7, 1961 |